UNITED STATES PATENT OFFICE.

JACOB KORMANN, OF DUBUQUE, IOWA.

IMPROVEMENT IN ARTIFICIAL STONE COMPOUND.

Specification forming part of Letters Patent No. 182,937, dated October 3, 1876; application filed July 19, 1876.

*To all whom it may concern:*

Be it known that I, JACOB KORMANN, of Dubuque, in the county of Dubuque and State of Iowa, have invented certain new and useful Improvements in Artificial Stone Compound; and I do hereby declare that the following is a clear and exact description of my invention, which will enable others skilled in the art to which it pertains to make and use it.

The object of my invention is to produce an artificial stone compound which combines comparative lightness with durability, and which may be easily molded into any suitable shape.

In carrying out my invention I take of brick-dust, one part; cement, one part; coal-dust, one-half part; plaster-of-paris, three parts; and of soft or rain water, two parts. These various ingredients are thoroughly intermixed, after which the plastic mass is poured into suitable molds and tamped, so as to form a solid and homogeneous mass. In about fifteen minutes the compound will have "set," and the molded articles may be turned out and placed in a suitable place to dry.

My improved compound will be found useful for the manufacture of a large variety of articles, being readily molded into any desired shape. I intend to apply it mainly to the manufacture of coffins, which, when made of this material, will be perfectly air-tight and impervious to water.

The compound is not brittle, and it will receive any kind or color of paint.

Having thus described my invention, I claim and desire to secure by Letters Patent of the United States—

An artificial stone compound, consisting of brick-dust, cement, coal-dust, plaster-of-paris, and rain-water in about the proportions named, and for the purpose herein shown and specified.

JACOB KORMANN.

Witnesses:
HUBERT O'DONNELL,
H. E. WILSON.